United States Patent
Tzadikevitch et al.

(10) Patent No.: US 8,682,846 B2
(45) Date of Patent: *Mar. 25, 2014

(54) CONTENT ITEM RECONCILIATION

(75) Inventors: Gil Tzadikevitch, Yavne, IL (US);
Nimrod Nahum, Yagel, IL (US)

(73) Assignee: Hewlett-Packard Development Company, L.P., Houston, TX (US)

(*) Notice: Subject to any disclaimer, the term of this patent is extended or adjusted under 35 U.S.C. 154(b) by 12 days.

This patent is subject to a terminal disclaimer.

(21) Appl. No.: 13/279,335

(22) Filed: Oct. 24, 2011

(65) Prior Publication Data

US 2013/0066911 A1 Mar. 14, 2013

Related U.S. Application Data

(60) Provisional application No. 61/532,652, filed on Sep. 9, 2011.

(51) Int. Cl.
*G06F 17/00* (2006.01)
*G06F 17/30* (2006.01)

(52) U.S. Cl.
CPC ............... *G06F 17/00* (2013.01); *G06F 17/30* (2013.01)
USPC ........... 707/610; 707/616; 707/619; 707/626; 707/634; 707/641; 707/802

(58) Field of Classification Search
CPC .................................. G06F 17/00; G06F 17/30
USPC ............... 707/600–603, 609–616, 618–620, 707/790–792, 807–808, 626, 633, 634, 635, 707/641, 802–803; 709/203, 206, 215–220

See application file for complete search history.

(56) References Cited

U.S. PATENT DOCUMENTS

| | | | |
|---|---|---|---|
| 5,878,431 A * | 3/1999 | Potterveld et al. | 707/694 |
| 7,558,770 B2 * | 7/2009 | Doyle et al. | 706/45 |
| 2002/0169745 A1 * | 11/2002 | Hotti et al. | 707/1 |
| 2004/0059812 A1 * | 3/2004 | Assa | 709/224 |
| 2006/0225032 A1 | 10/2006 | Klerk et al. | |
| 2007/0294237 A1 * | 12/2007 | John et al. | 707/4 |
| 2007/0294661 A1 * | 12/2007 | Devarakonda et al. | 717/104 |
| 2008/0209005 A1 | 8/2008 | Akamatsu et al. | |
| 2009/0063562 A1 * | 3/2009 | Dinger et al. | 707/104.1 |
| 2010/0023921 A1 * | 1/2010 | Chaar et al. | 717/102 |
| 2010/0100532 A1 * | 4/2010 | Landry et al. | 707/662 |
| 2010/0115100 A1 * | 5/2010 | Tubman et al. | 709/227 |

(Continued)

FOREIGN PATENT DOCUMENTS

| | | | |
|---|---|---|---|
| EP | 2 466 454 | * | 6/2012 |
| WO | WO 0248910 | * | 6/2002 |
| WO | WO 2011106776 | * | 9/2011 |

OTHER PUBLICATIONS

Product Brief: CA CMDB; "CA Configuration Management Database (CMDB)", Copyright © 2008, 7 pages.*

(Continued)

*Primary Examiner* — Srirama Channavajjala

(57) ABSTRACT

A source configuration management database (CMDB) is of an information technology (IT) infrastructure that includes an IT resource represented by a configuration item (CI). A target CMDB is of the IT infrastructure that includes the IT resource, too. The given CI is recursively reconciled to the target CMDB from the source CMDB.

11 Claims, 2 Drawing Sheets

(56) References Cited

U.S. PATENT DOCUMENTS

| | | |
|---|---|---|
| 2010/0250935 A1 | 9/2010 | Ginter et al. |
| 2011/0022688 A1* | 1/2011 | Gvirtsman et al. ........... 709/220 |
| 2011/0029767 A1* | 2/2011 | Ayachitula et al. ........... 713/100 |
| 2011/0161288 A1* | 6/2011 | Morimoto et al. ........... 707/611 |
| 2011/0314050 A1* | 12/2011 | Matsubara et al. ........... 707/769 |
| 2013/0332490 A1* | 12/2013 | Hu et al. ........................ 707/798 |

OTHER PUBLICATIONS

Technical Whitepaper, Maintain accurate CMBD through reconciliation, 2005, 2009 BMC Software, Inc., 8 pages.*

* cited by examiner

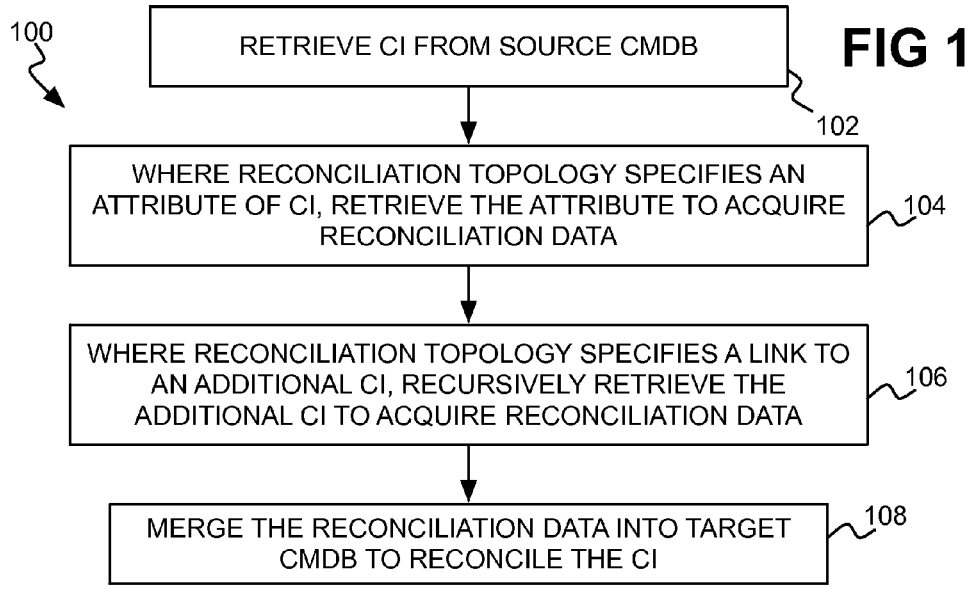
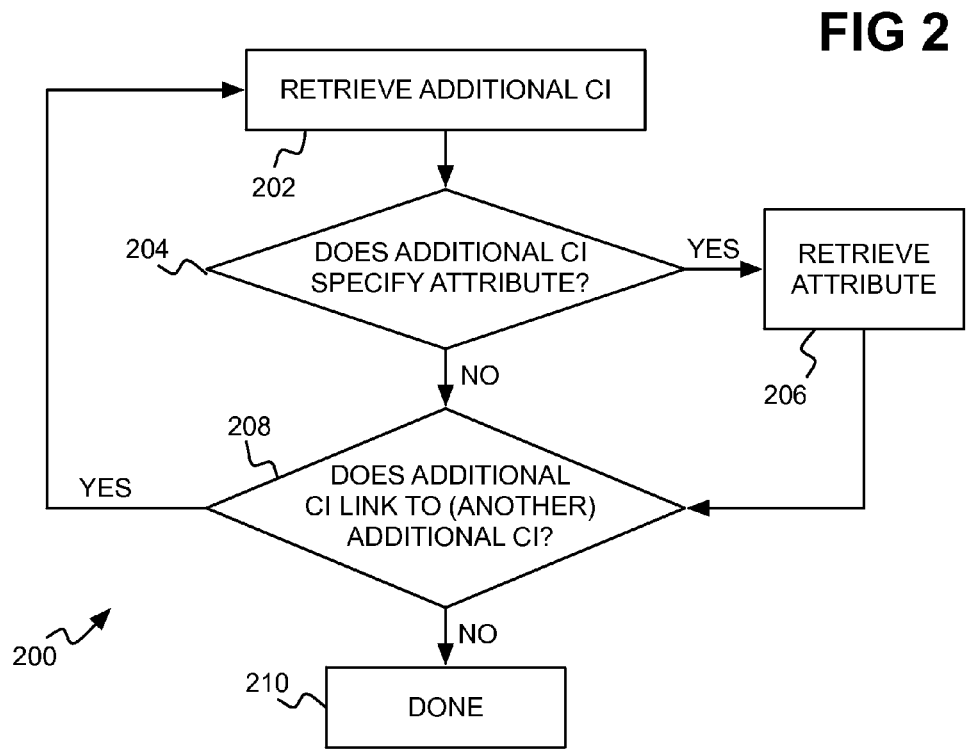

CONTENT ITEM RECONCILIATION

RELATED APPLICATIONS

The present patent application claims the benefit of and priority to the previously filed and presently pending US provisional patent application entitled "automatically identifying reconciliation requirements," filed on Sep. 9, 2011, and assigned U.S. patent application No. 61/532,652, which is now abandoned.

BACKGROUND

A configuration management database (CMDB) is a repository of information related to information technology (IT) resources of an IT infrastructure. Examples of IT resources include computing system nodes, servers, databases, as well as other hardware and software elements. A CMDB includes details of configuration items (CIs) within an IT infrastructure. A CI is a structural unit of a CMDB, and designates an element that configuration management treats as a single entity. A CI thus represents an IT resource.

BRIEF DESCRIPTION OF THE DRAWINGS

FIG. 1 is a flowchart of an example method for recursively reconciling a content item (CI) to a target configuration management database (CMDB) from a source CMDB.

FIG. 2 is a flowchart of an example method to recursively retrieve a CI, and which may be performed in one part of the method of FIG. 1.

DETAILED DESCRIPTION

Figure 3:
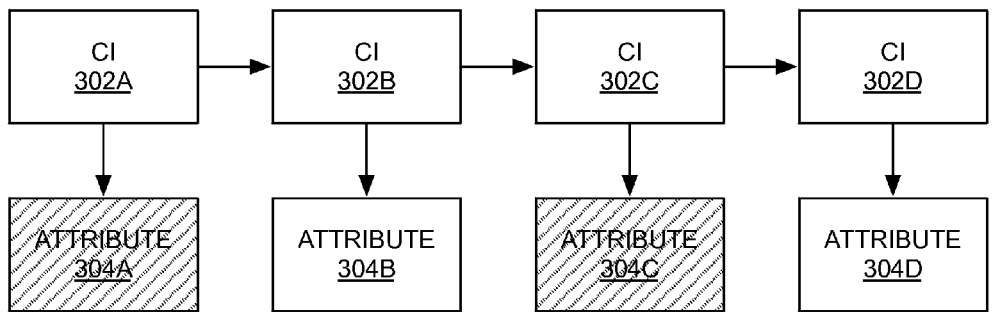
FIG. 3 is a diagram that illustratively depicts example performance of the methods of FIGS. 1 and 2.

As noted in the background section, a configuration management database (CMDB) is a repository of information related to an information technology (IT) infrastructure including IT resources. A topology of a CMDB specifies the IT infrastructure and the IT resources that are delineated in the CMDB, and can be defined via a topology query language (TQL). A CMDB includes configuration items (CIs), which each may represent an IT resource. A CI is an instance of a CI type, and has a number of attributes corresponding to individual pieces of information that the CI contains. A CI may further have a number of links to other CIs that specify where individual pieces of information that the CI contains reside. As such, each piece of information that a CI contains may be specified directly via attributes, or referentially via links to other CIs.

At times a CI may have to be reconciled to a target CMDB from a source CMDB. Existing approaches for reconciling a CI to a target CMDB from a source CMDB can be disadvantageous, however. Existing approaches are generally not topology-based. That is, existing approaches usually synchronize all the attributes and links of each CI, which may not be desirable, and which typically results in reconciliation becoming a very bandwidth-, processor-, and database-intensive operation. Furthermore, existing reconciliation approaches may not be compatible with engines and other components of a CMDB system.

Disclosed herein are reconciliation techniques that overcome these drawbacks. These techniques recursively reconcile a CI to a target CMDB from a source CMDB, in a topology-based manner. The CI is retrieved from the source CMDB. A topology governing reconciliation and defined via a TQL specifies one or more attributes of the CI to be reconciled, and/or one or more links to additional CIs to be reconciled. For each such attribute of the CI, the attribute is retrieved from the source CMDB to acquire reconciliation data. For each such link to an additional CI, the additional CI is recursively retrieved to acquire the reconciliation data. The reconciliation data is then merged into the target CMDB to reconcile or synchronize the CI.

FIG. 1 shows an example method 100 for recursively reconciling a CI to target CMDB from a source CMDB in a topology-based manner. A computing device, such as a desktop or a laptop computer, may perform the method 100. For instance, a processor of such a computing device may execute a computer program from a non-transitory computer-readable data storage medium to implement the method 100.

The method 100 is described in relation to one CI to be synchronized from the source CMDB to the target CMDB. The method 100 can be repeated for each CI to be synchronized from the source CMDB to the target CMDB, however. Furthermore, the method 100 is described in relation to the CI including one attribute of the CI to be synchronized, and/or one link to an additional CI to be synchronized. However, the method 100 can be extended where the CI includes more than one attribute to be synchronized, and/or more than one link to additional CIs to be synchronized.

A reconciliation topology defined in a TQL governs the synchronization or reconciliation of the CI from the source CMDB to the target CMDB in this respect. In particular, the reconciliation topology can define the attribute(s) and/or the link(s) to additional CIs that are to be synchronized. The CI may include other attributes and/or other links that are not synchronized, however. The reconciliation topology may be defined ahead of time, or may be generated at the time the method 100 is performed, from a specification of what attributes and/or links of the CI are to be reconciled.

The CI to be recursively synchronized from the source CMDB to the target CMDB is retrieved from the source CMDB (102). This means that the specification of the attributes and/or the links of the CI is obtained from the topology of the source CMDB that is specified within a TQL. Attributes can include characteristics of the CI, such as the capabilities and other information of and regarding the IT resource that the CI represents. For example, for a hardware network node, the attributes can include the node's network address, how much memory the node has, its processor speed, and so on. Where such a piece of information is not included directly in the CI as an attribute, it is included referentially as a link to an additional CI that includes the information in question.

Where the reconciliation topology specifies an attribute of the CI that is to be synchronized from the source CMDB to the target CMDB, this attribute is retrieved to acquire reconciliation data (104). Where the reconciliation topology specifies a link to an additional CI to be synchronized from the source CMDB to the target CMDB, the additional CI is recursively retrieved to acquire the reconciliation data (106). One approach to perform such recursive retrieval is described later in the detailed description, and an example of such recursive retrieval is also described later in the detailed description.

As noted above, the CI may include other attributes, in addition to the attribute specified within the reconciliation topology, and other links, in addition to the link specified within the reconciliation topology. These other attributes and/or other links are not reconciled, which is why the method 100 is considered a topology-based reconciliation approach. Furthermore, the reconciliation topology may specify just one or more attributes to be reconciled or just one or more links to additional CIs to be reconciled, and not both.

Once reconciliation data has been acquired, the reconciliation data is merged within the target CMDB to reconcile the CI from the source CMDB to the target CMDB (108). As one example, merging may include replacing just the information contained within the reconciliation data that is more recent than corresponding information for the CI already stored within the target CMDB. As another example, merging may include overwriting the information already stored within the target CMDB for the CI with the information contained within the reconciliation data. The former merging approach is more granular than the latter merging approach.

FIG. 2 shows an example method 200 to recursively retrieve an additional CI that is linked by a CI undergoing reconciliation from a source CMDB to a target CMDB. The method 200 may thus be used to implement part 106 for a given attribute of a CI. Like the method 100, the method 200 may be implemented by a processor executing a computer program from a computer-readable data storage medium.

The additional CI is retrieved (202). The additional CI may be stored in the source CMDB, or in another CMDB other than the source CMDB. The additional CI includes one or more attributes and/or one or more links to still other CIs. If the additional CI specifies (i.e., includes) one or more attributes (204), each such attribute is retrieved to acquire the reconciliation data (206). If the additional CI links to one or more other CIs (208), then the method 200 is repeated at part 202 for each such linked-to CI. When a CI is reached that does not have links to other relevant CIs (208), the method 200 is finished (210).

The method 200 is considered a recursive reconciliation approach, because as a CI links to other CIs, those other CIs are likewise examined, per the feedback path from part 208 to part 202. The recursion may be achieved in one of two different ways. First, each link to another CI may be followed in part 208 back to part 202. Second, a link to another CI may be followed in part 208 back to part 202 just if the linked-to CI relates to the information specified within the reconciliation topology governing synchronization of a CI in the method 100.

For example, a reconciliation topology may govern reconciliation of a CI pursuant to the method 100 in that a network address of the IT resource to which the CI corresponds is to be synchronized. The CI as stored within the source CMDB may not directly include this information as an attribute, but instead reference an additional CI within a link. As such, the method 200 is performed for this additional CI. The additional CI may itself include this information as an attribute, but may also include links to still other CIs for still other information. Because the additional CI has been acquired for the purpose of obtaining the network address—and this information is contained directly as an attribute within the additional CI—though, these other CIs do not have to themselves be acquired.

Similarly, the attributes of the additional CI(s) may be retrieved in the method 200 in one of two different ways. First, each attribute of an additional CI may be retrieved in part 206. Second, an attribute of an additional CI may be retrieved in part 206 just if the attribute relates to the information specified within the reconciliation topology governing synchronization of a CI in the method 100.

FIG. 3 illustratively depicts example performance of the methods 100 and 200. FIG. 3 depicts CIs 302A, 302B, 302C, and 302D, which are collectively referred to as the CIs 302. The CIs 302 respectively include attributes 304A, 304B, 304C, and 304D, which are collectively referred to as the attributes 304.

The CI 302A is to be recursively reconciled from a source CMDB to a target CMDB, in a topology-based manner. Specifically, a reconciliation topology defined via a TQL may indicate that two pieces of information of the CI 302A are to be reconciled from the source CMDB to the target CMDB. The first piece of information may be directly contained in the attribute 304A of the CI 302A itself. The second piece of information may be directly contained in the attribute 304C of a different CI 302C. The CIs 304A and 304C are shaded in FIG. 3 to indicate that they contain the information specified by the reconciliation topology.

In accordance with the method 100, the CI 302A is retrieved from the source CMDB in part 102, and the attribute 304A of the CI 302A is retrieved to acquire the first piece of information (i.e., a first portion of the reconciliation data) in part 104. However, the second piece of information is contained by the CI 302A referentially, via a link to the CI 302B. Therefore, the CI 302B is recursively retrieved in part 106, via performance of the method 200.

In accordance with the method 200, the CI 302B is retrieved. The attribute 304B does not contain the second piece of information of interest, such that part 204 proceeds directly to part 208, and not to part 206. The attribute 304B of the CI 302B is thus not retrieved. The method 200 recursively loops back from part 208 to part 202, at which the CI 302C to which the CI 302B is linked is retrieved.

The CI 302C does contain the second piece of information of interested. As such, the method 200 proceeds from part 204 to part 206 to acquire the second piece of information (i.e., a second portion of the reconciliation data) from within the attribute 304C. Although the CI 302C does link to the CI 302D, the reconciliation data specified by the reconciliation topology has now been completely retrieved. Therefore, the method 200 proceeds from part 208 to part 210, at which part the method 200 is finished, instead of recursively looping back to part 202 to retrieve the CI 302D. The method 100 then merges both portions of the reconciliation data that has been obtained into the target CMDB to reconcile the CI 302A, in part 208.

In this example of FIG. 3, then, the CI 302D is not retrieved, and the attribute 304D of the CI 302D is not retrieved. The attribute 304B of the CI 302B is also not retrieved. This is because the attributes 304B and 304D do not include information specified by the reconciliation topology governing reconciliation of the CI 302A from the source CMDB to the target CMDB in this example.

Figure 4:
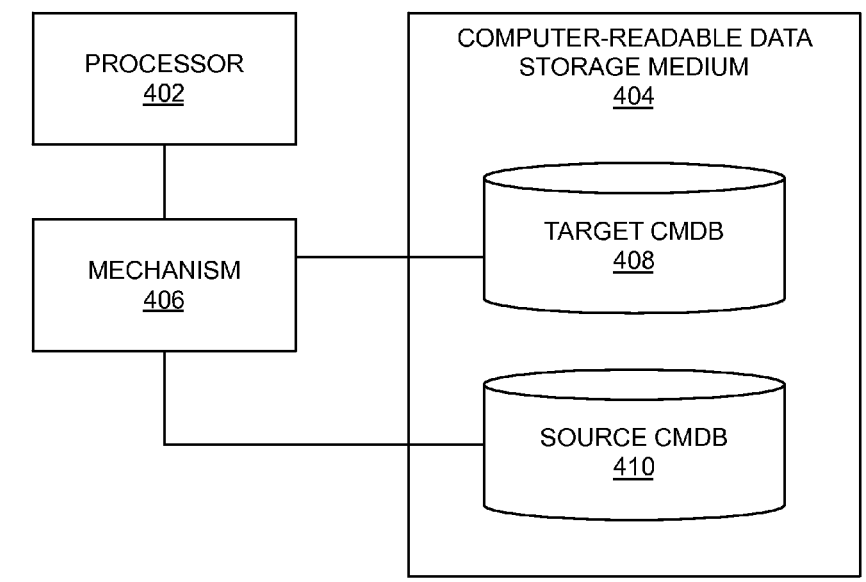
FIG. 4 is a diagram of an example system for recursively reconciling a a CI to a target CMDB from a source CMDB.

FIG. 4 shows an example system 400 for reconciling a CI to a target CMDB 408 from the source CMDB 410. The system 400 can be implemented as a computing device, such as a desktop or a laptop computer. The system 400 includes at least a processor 402, a computer-readable data storage medium 404, and a mechanism 406. The system 400 can further include other components, in addition to and/or in lieu of those depicted in FIG. 4.

The computer-readable data storage medium 404 may be or include a non-volatile medium and/or a volatile medium. The computer-readable data storage medium 404 stores the target CMDB 408 and the source CMDB 410. The mechanism 406 is said to be implemented by the processor 402, in that, for instance, the mechanism 406 may be realized by a computer program that is executable by the processor 402. The computer program may be stored on the computer-readable data storage medium 404, or another computer-readable data storage medium. The mechanism 406 can perform the methods 100 and 200 that have been described, and thus recursively reconciles a CI to the target CMDB 408 from the source CMDB 408 in a topology-based manner.

We claim:

1. A method comprising:

for a given configuration item (CI) representing an information technology (IT) resource undergoing synchronization from a source configuration management database (CMDB) of an IT infrastructure including the IT resource to a target CMDB of the IT infrastructure, as specified within a topology governing reconciliation and defined via a topology query language (TQL), retrieving, the given CI from the source CMDB, by a processor, the given CI including one or more of: an attribute of the given CI, the attribute specified by the topology; a link to an additional CI, the link specified by the topology;

where the topology specifies an attribute of the given CI, retrieving the attribute of the CI from the source CMDB, by the processor, to acquire reconciliation data;

where the topology specifies a link to an additional CI of the given CI, recursively retrieving the additional CI, by the processor, to acquire the reconciliation data; and, merging, by the processor, the reconciliation data into the target CMDB to reconcile the given CI from the source CMDB, wherein the additional CI is a first additional CI, and wherein recursively retrieving the first additional CI comprises:

retrieving the first additional CI, the first additional CI including one or more of: an attribute of the first additional CI, a link to a second additional CI, to acquire the reconciliation data;

where the first additional CI includes an attribute to acquire the reconciliation data, retrieving the attribute of the first additional CI; and, where the first additional CI includes a link to a second additional CI to acquire the reconciliation data, recursively retrieving the second additional CI.

2. The method of claim 1, wherein the method is a topology-based method for recursively reconciling the given CI to the target CMDB from the source CMDB.

3. The method of claim 2, wherein the method is a topology-based method for recursively reconciling the given CI to the target CMDB from the source CMDB at least insofar as, where the given CI includes a link to an additional CI, the additional CI is recursively retrieved.

4. The method of claim 2, wherein the method is a topology-based method for recursively reconciling the given CI to the target CMDB from the source CMDB at least insofar as just the attribute of the given CI specified within the topology is synced, and no other attribute of the given CI is synced.

5. The method of claim 1, wherein recursively retrieving the second additional CI further comprises:

retrieving the second additional CI, the second additional CI including one or more of: an attribute of the second additional CI, a link to a third additional CI to acquire the reconciliation data;

where the second additional CI includes an attribute to acquire the reconciliation data, retrieving the attribute of the second additional CI; and, where the second additional CI includes a link to a third additional CI to acquire the reconciliation data, recursively retrieving the third additional CI.

6. The method of claim 1, wherein merging the reconciliation data into the target CMDB to reconcile the given CI from the source CMDB comprises:

where the reconciliation data includes information for the given CI different than the information for the CI within the target CMDB, replacing the information for the CI within the target CMDB with the information for the given CI within the reconciliation data.

7. The method of claim 1, wherein recursively retrieving the additional CI to acquire the reconciliation data comprises:

(a) retrieving the additional CI;

(b) after performing (a), in response to determining that the additional CI includes a given attribute providing information that is the reconciliation data, retrieving the given attribute of the additional CI to obtain the information such that the reconciliation data is obtained;

(c) after performing (b), in response to determining that the reconciliation data has not yet been obtained, and in response to determining that the additional CI includes a given link to a given CI, setting the additional CI to the given CI such that the additional CI is now the additional CI, and proceeding back to (a).

8. A non-transitory computer-readable data storage medium storing a computer program executable by a processor to perform a topology-based method for recursively reconciling a given configuration item (CI) representing an information technology (IT) resource of an IT infrastructure from to a target configuration management database (CMDB) of the IT infrastructure from a source CMDB of the IT infrastructure, the method comprising:

acquiring the given CI from the source CMDB, the given CI including one or more of: an attribute of the given CI and a link to an additional CI, the attribute and the link specified by a topology governing reconciliation and defined by a topology query language (TQL);

where the topology specifies an attribute of the given CI, retrieving the attribute of the given CI from the source CMDB to acquire reconciliation data;

where the topology specifies a link to an additional CI, recursively retrieving the additional CI to acquire the reconciliation data; and, reconciling the given CI within the target CMDB based on the reconciliation data, wherein the additional CI is a first additional CI, and wherein recursively retrieving the first additional CI comprises:

retrieving the first additional CI, the first additional CI including one or more of: an attribute of the first additional CI, a link to a second additional CI, to acquire the reconciliation data;

where the first additional CI includes an attribute to acquire the reconciliation data, retrieving the attribute of the first additional CI;

where the first additional CI includes a link to a second additional CI to acquire the reconciliation data, recursively retrieving the second additional CI.

9. The non-transitory computer-readable data storage medium of claim 8, wherein the method is a topology-based method for recursively reconciling the given CI to the target CMDB from the source CMDB at least insofar as:

where the topology specifies a link to an additional CI, the additional CI is recursively retrieved; and, just the attribute of the given CI specified within the topology is synced, and no other attribute of the given CI is synced.

10. The non-transitory computer-readable data storage medium of claim 8, wherein recursively retrieving the second additional CI further comprises:

retrieving the second additional CI, the second additional CI including one or more of: an attribute of the second additional CI, a link to a third additional CI to acquire the reconciliation data;

where the second additional CI includes an attribute to acquire the reconciliation data, retrieving the attribute of the second additional CI; and, where the second additional CI includes a link to a third additional CI to acquire the reconciliation data, recursively retrieving the third additional CI.

11. A system comprising:

a processor;

a computer-readable data storage medium to store:
- a source configuration management database (CMDB) of an information technology (IT) infrastructure including a plurality of IT resources represented by a plurality of configuration items (CI);
- a target CMDB of the IT infrastructure, a given CI of the target CMDB undergoing reconciliation from the source CMDB; and,
- a mechanism implemented at least by the processor to recursively reconcile the given CI to the target CMDB from the source CMDB, wherein the mechanism is to recursively reconcile the given CI to the target CMDB from the source CMDB by:
acquiring the given CI from the source CMDB, the given CI including one or more of: an attribute of the given CI and a link to an additional CI, the attribute and the link specified by a topology governing reconciliation and defined by a topology query language (TQL);

where the topology specifies an attribute of the given CI, retrieving the attribute of the given CI from the source CMDB to acquire reconciliation data;

where the topology specifies a link to an additional CI, recursively retrieving the additional CI to acquire the reconciliation data; and, reconciling the given CI within the target CMDB by merging the reconciliation data into the target CMDB, wherein the additional CI is a first additional CI, and wherein the mechanism is to recursively retrieve the first additional CI by:

retrieving the first additional CI, the first additional CI including one or more of: an attribute of the first additional CI, a link to a second additional CI, to acquire the reconciliation data;

where the first additional CI includes an attribute to acquire the reconciliation data, retrieving the attribute of the first additional CI;

where the first additional CI includes a link to a second additional CI to acquire the reconciliation data, recursively retrieving the second additional CI.

\* \* \* \* \*